Nov. 28, 1967    R. D. JOSEPH ET AL    3,354,503
URETHANE FOAMING APPARATUS
Filed April 2, 1964    4 Sheets-Sheet 1
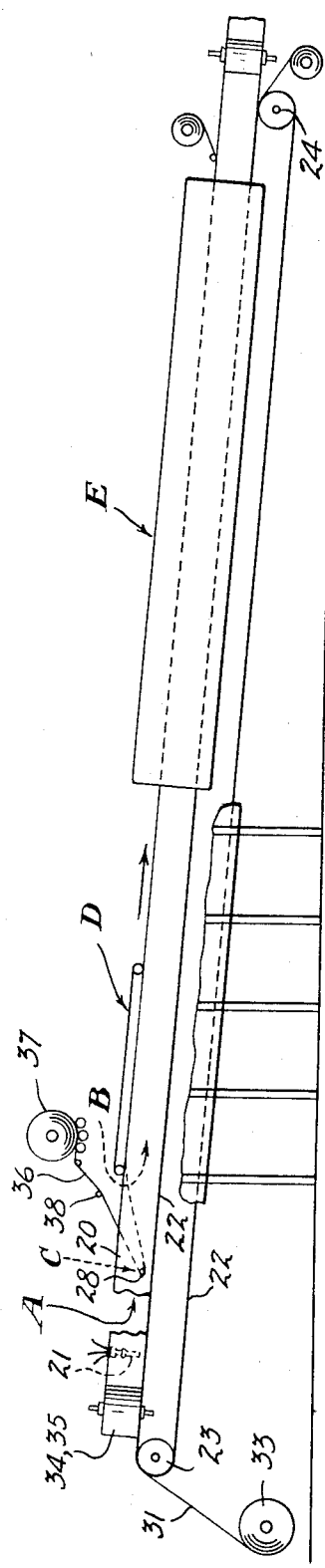
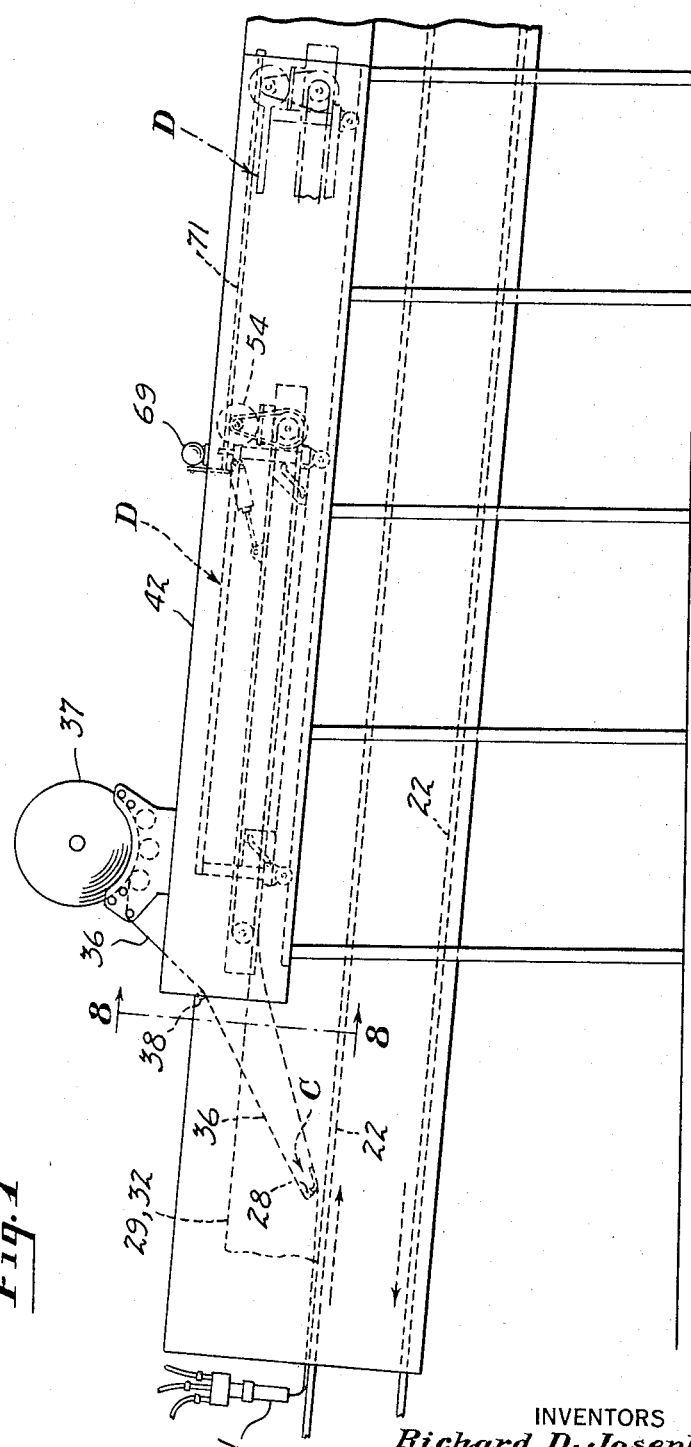
INVENTORS
Richard D. Joseph
Robert W. Mitten
BY McCoy, Greene, Medest
+ Te Grotenhuis
ATTORNEYS

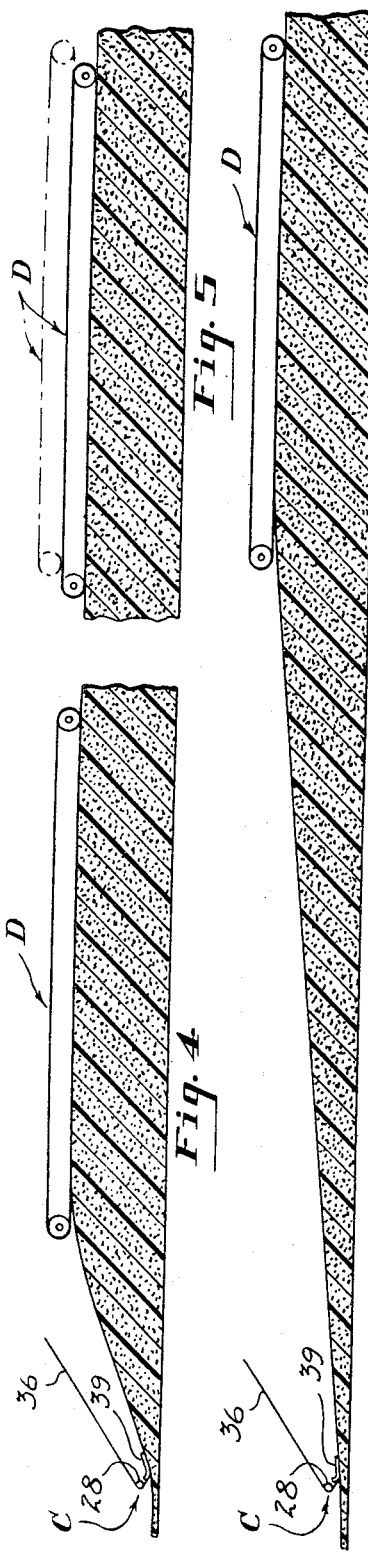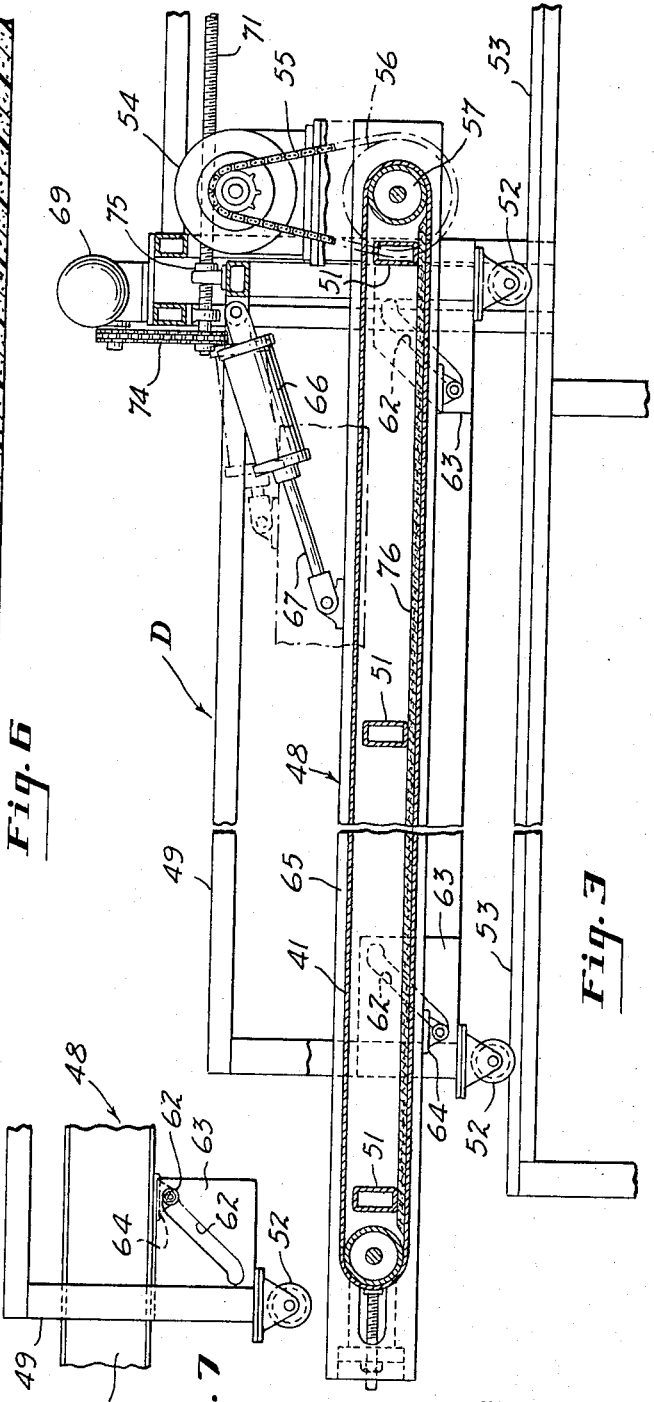

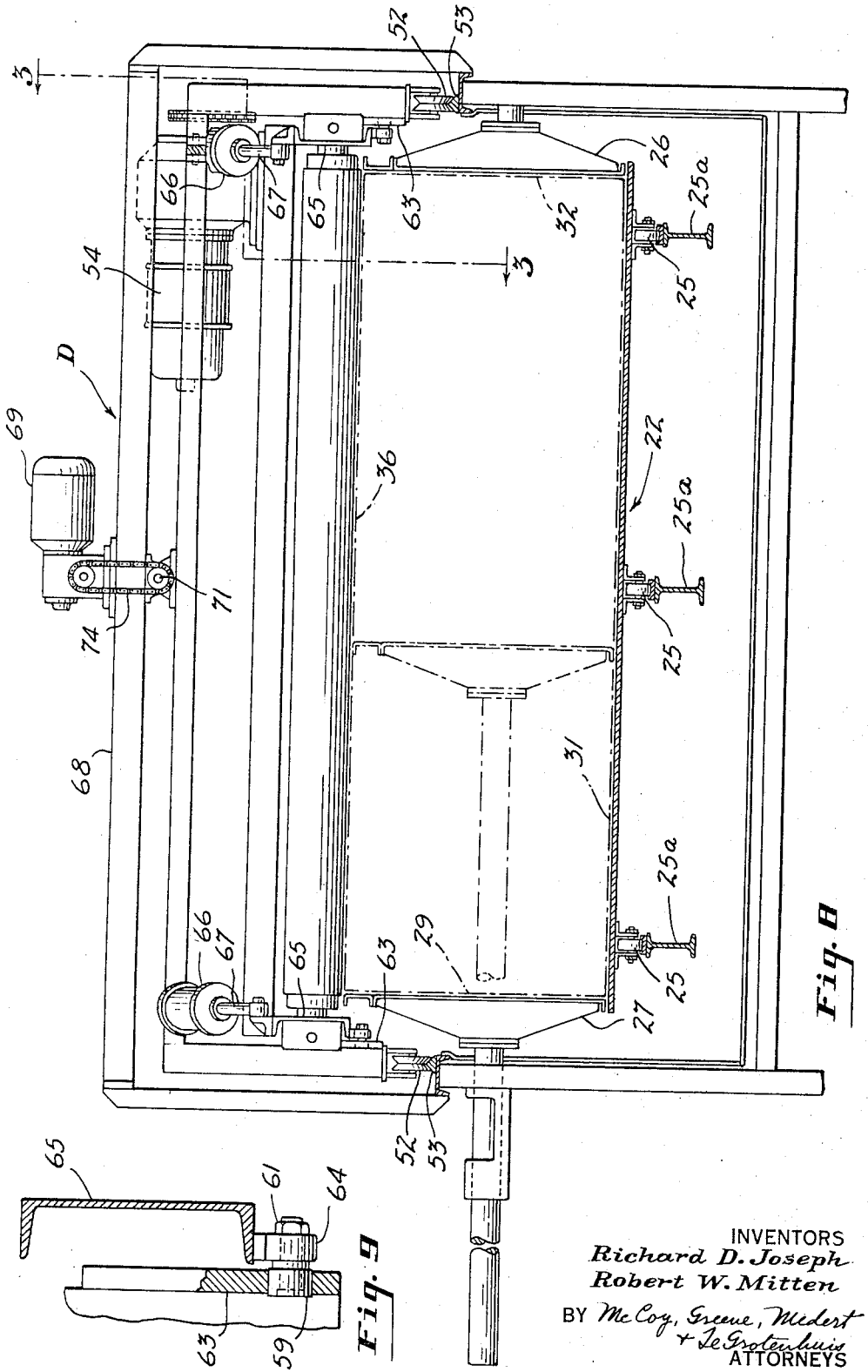

Nov. 28, 1967  R. D. JOSEPH ET AL  3,354,503
URETHANE FOAMING APPARATUS
Filed April 2, 1964  4 Sheets-Sheet 4

INVENTORS
Richard D. Joseph
Robert W. Mitten
BY McCoy, Greene, Medert
& Te Grotenhuis
ATTORNEYS United States Patent Office 3,354,503
Patented Nov. 28, 1967

3,354,503
URETHANE FOAMING APPARATUS
Richard D. Joseph, Marion, and Robert W. Mitten, Wabash, Ind., assignors to The General Tire & Rubber Company, Akron, Ohio, a corporation of Ohio
Filed Apr. 2, 1964, Ser. No. 356,707
2 Claims. (Cl. 18—4)

ABSTRACT OF THE DISCLOSURE

In a polyurethane foaming machine a liquid foamable stream is cast upon the inside, bottom surface of a moveable mold. The substantially liquid foam passes under a floating assembly which comprises an elongated, horizontal, member extending across the upper surface of the liquid or liquefied foam and in conjunction with a top covering material serves to orientate the liquid foam away from the edges of the liquid foam stream and toward the center of the stream. Simultaneously with passing under the floating assembly, the substantially liquid foam is contacted with the porous top covering material which is guided and lightly pressed by the said floating assembly which separates it from the foaming liquid. The covering material forms the top cover for the foam and is coextensive with the said foam. The foam continues to advance and rises as the components of the foam react and gas is produced, until contact is made through the covering medium with an upper endless conveyor moving along the axis of the mold at the same speed as the foam. The top covering material, in turn, it pressed by the lower portion of the conveyor and the uncured foam is further oriented. The foam is then passed into a curing chamber where its shape, due to the apparatus modifications and methods described, is fixed so that each side is substantially at right angles to the adjacent side.

This invention relates to a foaming apparatus and more particularly to an apparatus for producing a controlled top surface on a slab of urethane foam.

Heretofore, cured slabs of foam have exhibited a tendency to rise higher at the center portion than at the periphery. Such foams, when cured, resembled a loaf of bread because of the high rise or crowning effect of the center portion. Efforts to eliminate the crowning effect led first to the somewhat erroneous belief that the curvature of the top of the foam slab was caused by unequal distribution of the foaming material and that a simple process of channeling foam from the areas where the foam was known to heighten to those areas where the foam was known not to heighten would remedy the effect. However, such efforts met with little or no success. Initial efforts to redistribute the liquid foam led to the placement of a stationary plate above the bed of the foaming trough, but the rising foam flowed in front of and behind the plate without any significant reduction in the crown.

Also, such initial efforts at constructing a stationary plate above the rising foam met with the difficulty that voids or lakes were formed in the surface of the cured foam. Then, too, the cell structures of the foams so produced were nonuniform and undesirable for commercial use. Further research showed that the crowning effect was due largely to densification of the liquid foam at the sidewalls rather than to the unequal distribution of the liquid foam. Also contributing to the crowning effect was an irregularity in heat dissipation. Studies showed that there was considerable temperature difference between the curved side portions and the areas of the foam slab away from the sides. The curved areas with an approximate four to five inch radii exhibited a significant drop in temperature. Based on this knowledge it was assumed that the temperature loss at the outside, exposed corners was another factor besides the densification that had to be included into any solution of the problem. As the more dense areas were the coolest areas, it followed that best results could be expected by reducing the density of the curved areas around the periphery of the slab and by maintaining a high uniform temperature within the slab itself.

Accordingly, it is an object of this invention to provide apparatus adapted to produce a rectangular slab of urethane foam.

It is another object to provide apparatus adapted to produce a foam slab without the crowning effect.

It is another object to provide apparatus adapted to produce a foam slab in which all sides are square.

It is another object to provide apparatus adapted to eliminate large voids or lakes on the surface of the foam slab.

It is still another object to provide apparatus adapted to produce a foam of uniform density.

It is another object to provide apparatus adapted to eliminate the hard, tough upper surface of the foam slab and obtain a foam slab of uniform porosity.

SYNOPSIS OF THE INVENTION

FIGURE 1 illustrates schematically the overall operation of the reaction and foaming apparatus. Covering material is joined so as to form an elongated foaming channel A which subsequently becomes a foaming tunnel B with the application of a top covering material. Prior to the application of the top covering, liquid foam is cast upon the inside, bottom surface of the approach surface or channel A. The substantially liquid foam, moving in the direction of the arrow passes under a floating shoe assembly C which comprises an elongated, horizontal, floating shoe extended across the upper surface of the foam, which shoe is hereinafter termed a hold-down-shoe, which acts to reduce the density of the upper surface of the rising foam slab and to orientate the foam away from the edges of the liquid foam stream and toward the center of the stream to aid in forming a finished foam of uniform density. Simultaneously with passing under the hold-down-shoe, the substantially liquid foam is contacted with a covering material which is guided by the said shoe and separates the shoe from the foaming liquid. The covering material forms the top cover for the foam and is coextensive with the said foam. The foam continues to advance in the foaming tunnel in the direction of the arrow and, concurrently, rises, as the components of the foam react and gas is produced, until contact is made through the covering medium with a floating frame assembly D which comprises, among other elements, an endless conveyor belt, hereinafter called a hold-down-belt, moving along the axis of the tunnel at the same speed as the foam. With the top surface of the foam slab pressing against the top covering material, which, in turn, is pressing against the lower portion of the hold-down-belt, and with the bottom surface of the foam slab in contact with the bottom covering material, the foam advances the full length of the hold-down-belt and into a curing chamber E. At the time the foam enters the oven, its shape, due to the apparatus and methods herebefore generally described, has been fixed so that each side is substantially at right angles to the adjacent side as shown in FIGURE 14. Upon curing, the foam retains this shape. By using the above generally described techniques, the cured foams possess the qualities of uniform porosity, soft, smooth surfaces, and rectangular shape.

FIGURE 1 of the drawings is a schematic view of the entire reaction and foaming apparatus;

FIGURE 2 is an enlarged elevational view of the foaming section of the apparatus of FIGURE 1;

FIGURE 3 is a sectional view as viewed from the line 3—3 of FIGURE 8;

FIGURES 4 and 6 are diagrammatic views showing the relative positions of the hold-down-belt with respect to the hold-down-shoe and the rising foam;

FIGURE 5 illustrates the relative vertical positions of the hold-down-belt to accompanying varying depths of foam;

FIGURE 7 is an elevational view of a fragment of the carriage showing the cam plate with the belt carrying frame adjusted to its highest position;

FIGURE 8 is substantially an end view of the foaming tunnel and foaming mold as viewed from the line 8—8 of FIGURE 2;

FIGURE 9 is a detailed view showing one of the cam plates and cam rollers;

Figure 10:
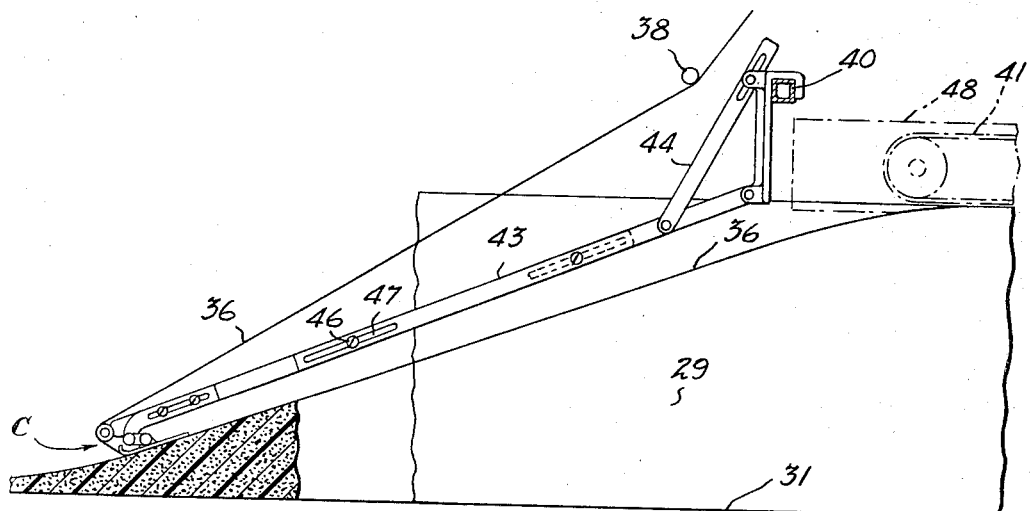
FIGURE 10 is a side elevational view of the hold-down-shoe assembly.
Figure 11:
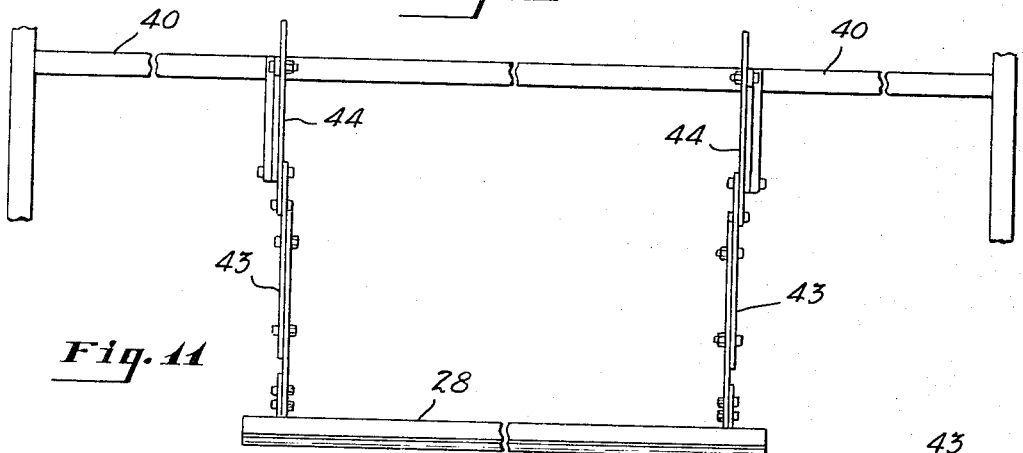
FIGURE 11 is a front elevational view of the hold-down-shoe assembly.
Figure 13:
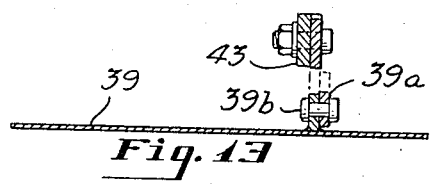
FIGURE 13 is a substantially vertical cross-sectional view through the hold-down-shoe taken on the line 13—13 of FIGURE 12.
Figure 12:
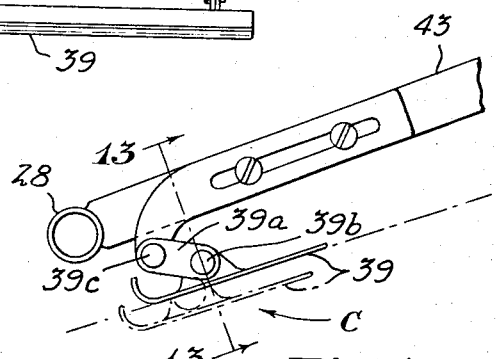
FIGURE 12 is an enlarged fragment of the hold-down-shoe assembly.
Figure 14:
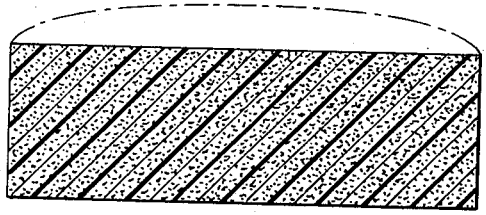
FIGURE 14 is a vertical cross-sectional view of completely expanded foam in the foaming tunnel as formed in the present invention. The curved top line indicates the foam shape heretofore experienced in making foam.

Referring more particularly to the drawings wherein like parts are provided with like numerals of reference throughout the several views, foaming mold 20 constitutes an elongated, rectangular, solid form, perferably designed so that it can be lined with a covering material and also designed so that there is an elongated, flat, approach surface onto which liquid foam may be discharged from a discharge head 21 that moves laterally back and forth across the width of the mold to lay a uniform layer of foamable liquid on the approach surface.

The term "mold" is used herein to describe the U-shaped solid support srtucture which may be used alone or, as subsequently described, in conjunction with a covering material to line the inner surfaces of the mold. The said covering material forms a channel when covering the U-shaped inner surface of the mold, but subsequently, upon the positioning of a top covering material, forms a tunnel.

The bottom or floor of the mold is the uppermost surface of a substantially horizontal, endless conveyor 22, slightly elevated at one end so that a stream of foam cast upon the bottom of the mold will flow away from the discharge head which is positioned at the elevated end of the endless conveyor. The conveyor 22, carried over sprockets 23 and 24 and supported by rollers 25 on frame members 25a, supports the liquid foaming material and foam in the mold formed by the covering material, release paper or equivalent. The conveyor itself may be made of a metal or non-metal, its only requirement being that it must support the foam slab through continuous and prolonged use.

Lateral surfaces 26 and 27 of the mold (FIGURE 8) are aluminum or steel and are substantially perpendicular to the top surface of the conveyor. The said surfaces function to prohibit the horizontal expansion of the liquid foam. The lateral surface 26 is designed so as to be stationary and the other lateral surface 27 is adjustable so that the internal volume of the mold may be readily adjusted to increase or diminish the horizontal surface of the foam slab. Thus, the adjustable side wall may be moved inward and outward at right angles to the axis of the centerline of the foaming mold depending on the width of the foam desired. For example, if narrow slabs of foam are needed, the adjustable side portion can be adapted to the width wanted by shifting the entire side in an inward direction.

The bottom and lateral surfaces of the mold as aforementioned are covered or lined with a flexible covering material or web 29, 31 and 32, preferably of a suitable release paper and unwound from rolls 33, 34 and 35 so that a channel or trough is formed moving away from the discharge head. The covering material of the channel is supported by and conforms to the inner surface of the mold so as to form a U-shaped channel. The side wall coverings are substantially perpendicular to the conveyor's covering material and the U-shape of the channel is unchanged until a top covering material 36 is used to cover the moving channel so that a tunnel is formed. The top covering material 36 is fed from a powered roll 37 positioned above the liquid foam discharge head 21. The covering of substantially the same width as the U-shaped channel moves off the roll past an idler roll 38, around the shoe roller guide 28 and in contact with the hold-down-shoe 39, subsequently described in detail, which has the secondary role of guiding the top covering as it comes in contact with the foam. The hold-down-shoe is positioned within the channel, substantially perpendicular to the movement of the liquid foam, which foam is being carried away from the discharge head by the conveyor 22. The shoe while in contact with the top covering material rests gently on the surface of the substantially liquid foam and guides the top covering of the channel to the uppermost surface of the substantially liquid foam at a point between the discharge head and a point where the foam has just begun to rise, but is still liquid.

With the positioning of the top covering, the four surfaces of the foaming tunnel are present and form the tunnel of final shape. The top covering, which, due to the natural tackiness of the foam, has become slightly adhered to the upper surface of the foam and is coextensive with the upper surface of the foam, is lifted or inclined upwardly by the rising foam until the foam comes in contact with the hold-down-belt 41, subsequently described in detail. The internal cross-sectional area expansion of the tunnel now ceases and the foam, completely encompassed or confined by the tunnel and adhered to the tunnel on all surfaces by the natural tackiness of the foam, advances into a curing chamber 42.

The covering material forming the tunnel may be a porous or non-porous release paper, as a corrugated wax-covered paper, or may be a woven or non-woven fabric, as cotton, Dacron, nylon, a polyester or mixtures thereof, to be removed at a later time, or may be of a covering material that will become an integral part of a foam-fabric combination which could find a use commercially, such as a rug underlay. In any event, the covering material is of such consistency that it will not permit strike-through of the foam to come in contact with the hold-down-belt.

THE FLOATING SHOE ASSEMBLY

FIGURES 10, 11, 12, 13 and 14 refer to the floating shoe assembly. FIGURE 10 shows an adjustable, lateral shoe support 43, a lateral support brace 44 and the shoe 39. The shoe support 43 is pivotally attached to a support member 40 so that by adjusting the brace 44 the lower end of the shoe assembly may be raised or lowered. The support 43 is also extensible and by adjusting the bolts 46 in the slots 47, the floating shoe may be moved in a substantitally horizontal direction, toward or away from the discharge head 21.

The lug portion of the shoe is hingedly attached to a link member 39a by a link pin 39b. The link, in turn, is hingedly attached by means of another link pin 39c to the adjustable end member of the support 43. The two pins function to give the shoe a desirable freedom of movement so that the shoe while in contact with the top covering material may be said to "float" upon the surface of the rising foam.

The shoe itself is a narrow, lightweight shoe-shaped plate or bar substantially at right angles to the stream of foam and of substantially the same width as the foaming mold. The shoe applies gentle pressure to the uppermost surface of the foam by means of the top covering material 36 at a point where the foam is still soft and tacky and has just begun to gel. The shoe is in momentary direct contact with one face of the top covering material as the material cuotacts the shoe. The opposite face of the top covering material contacts the top surface of the foamable liquid so that light pressure is transferred from the said shoe to the uppermost surface of the liquid foam. The gentle pressure thus applied equally over the area covered by the hold-down-shoe adjacent to the juncture of the covering material and the foaming mixture orientates the more dense foam areas toward the center of the foam stream.

As mentioned earlier, research has shown that the curved loaf shape of the cured foam is not a problem of redistribution of the liquid foam but a problem of density and irregular heat dissipation. Research has shown that the areas of greatest density are those along the sidewalls or on the periphery of the foaming slab. The gentle pressure applied by the hold-down-shoe orientates the more dense foam toward the center of the foaming slab while the foam is still soft and tacky and causes the liquid foam to densify in those areas of traditionally lower density in this manner of orientating the liquid or rising foam the forming or growing cells are redistributed uniformly to aid in providing uniform foaming action and eventually a foam of generally uniform density. In addition, by the early application of the hold-down-shoe, the formation of a thick, high density leathery skin layer is prohibited. The prevention of the leathery, top-skin layer permits the final shaping of the loaf by the hold-down-belt by keeping the surface more pliable at the time of contact of the hold-down-belt with the foam.

The hold-down-shoe also eliminates the basic problem of irregular heat dissipation which, as mentioned, it is believed contributes to the curved or loaf shape by applying gentle pressure to the foaming mixture and, in effect, acts momentarily to form within the foaming mixture within and directly beneath the hold-down-shoe a confined area whereby expansion is restricted. The positioning of the hold-down-shoe is such that the foam has not begun to rise appreciably and the gentle pressure of the hold-down-shoe exceeds the rising force of the foam mixture. By thus momentarily containing the foaming mixture within the surfaces bounded by the foaming mold and the hold-down-shoe, the heat contained within the foaming mixture has an opportunity to distribute itself evenly throughout the mixture. As the foam remains completely encompassed within the foaming tunnel throughout the remainder of the process after passing from under the hold-down-shoe, the heat continues to be evenly distributed within the foaming slab and the heat is consequently evenly and uniformly dissipated.

The purpose of the shoe, therefore, is not to channel the swelling foams by providing a stationary obstacle, but rather to gently compress the rising foam to cause an orientation of the foam so that the curved loaf shape disappears. The amount of pressure applied is just that possessed by the weight of the floating shoe assembly itself. If perchance additional weight is needed, the shoe assembly is so designed that weights may be added without inhibiting the "floating" action. However, pressures greater than that applied by the weight of the shoe generally have the undesirable result of forcing the surface of the foam to roll toward the periphery of the slab which as aforementioned has not eliminated the problem of the rounded foam loaf.

The hold-down-shoe is positioned to function when the foam has reached the gel stage where it can support a top covering, without any deleterious effects to the foam, but at the same time is weak enough to be orientated, which as described, acts to eliminate the crowning of the foam slab and produce a product of uniform porosity and absent bubble voids.

FLOATING FRAME ASSEMBLY

The floating frame as shown in FIGURE 3 comprises generally a hold-down-belt 41 and a belt frame 48 supported generally by a movable carriage 49. The carriage composed of steel and aluminum supports 51 moves by means of inverted V type casters 52 on a V track 53 extending along the longitudinal axis of the foaming apparatus. Mounted on the movable carriage is a motor and speed reducing unit 54 connected to a drive chain 55 which, in turn, is connected to a roller chain sprocket 56 connected to a drive roll 57 of the hold-down-belt 41. The motor thus acts to drive the hold-down-belt. It is synchronized with the conveyor belt 22 forming the bottom support of the foaming tunnel so as not to hamper the horizontal movement of the foam slab.

The hold-down-belt 41 is positioned above the previously described foaming mold, parallel to the said first described conveyor and along the axis of the foaming mold. The hold-down-belt is also positioned farther away from the discharge head than the hold-down-shoe at a point where the foam has had an opportunity to rise a substantial amount, approximately maximum height. The hold-down-belt acts in conjunction with the hold-down-shoe by controlling the surface of the curing foam mixture.

In effect, the upward expansion of the foam is restricted as the foam, by means of the top covering material, comes in contact with the hold-down-belt. By thus inhibiting the rise of the foam, any remaining areas of less dense foam are densified as the foam presses the top covering material against the hold-down-belt.

The hold-down-belt, coupled with the hold-down-shoe, which as mentioned earlier, acts to orientate the more dense foam toward the center of the curing foam, reduce the density of the upper surface of the foam slab and to keep the said upper surface more pliable, retains the foaming mixture, in much the same orientation as was established by the hold-down-shoe. The action of these two features of the foaming apparatus acting in conjunction with one another and the connecting top covering material supply, more than any other single combination of features, to give the foam a uniform density and eliminate surface bubbles. One or the other contributes to the success of the invention but both are needed to fully eliminate the crowning effect.

As aforementioned, the floating frame is supported generally by a movable carriage, but is directly supported by the cam assembly shown in FIGURES 3, 7 and 9. The cam assembly is attached to the movable carriage frame 49 by means of cam rollers 59 attached to a cam pin 61, all of which moves in a general vertical direction in a cam slot 62 in cam plate 63 located at the four corners of the movable carriage 49. Attached also to the cam roller 59 is a bracket 64 which is attached to a channel beam 65 which supports the hold-down-belt 41. FIGURE 5 shows the relative vertical distance which the floating frame assembly may move.

The floating action of the floating frame assembly is achieved by means of pneumatic cylinders 66 and piston rods 67 which are attached to the belt frame 48 and the movable carriage 49.

Upon activation of the air cylinders 66, the belt frame 48 raises approximately six inches and retracts approximately seven inches through the travel of the cam rollers 59 in the cam plate 63.

Mounted on a stationary superstructure 68 is a reversible two speed motor 69 connected to a screw shaft 71 by means of drive sprockets and a chain drive 74. The screw shaft passes through a bearing nut 75 affixed to the movable carriage 49. By thus operating the motor 69 the hold-down-belt assembly may be positioned at any desired point along the track 53.

FIGURES 2 and 4 illustrate the importance of this function by demonstrating that for a foam composition characterized by a fast rise, the hold-down-belt may be brought somewhat closer to the liquid foam head. If a foam with a slower rise is used, the movable carriage may be displaced so as to allow additional rising time as shown in FIGURES 2 and 6. By thus allowing the carriage to move in a horizontal plane along the track, the foaming characteristics may be better controlled.

The belt itself is made of a woven or non-woven porous fabric. The preferred belt is a cotton, solid woven, three-ply fabric which by wicking action permits the escape and dispersion of the gas generated by the previously described foaming action.

The belt may also be of a non-perforated, non-porous nature if the covering material is of such a nature as to permit the escape of gases once the covering material comes into contact with the hold-down-belt.

To give the belt itself some rigidity, a porous or non-porous metal, or non-metal plate 76 is positioned within the belt frame so as to form a non-flexible retaining means to prohibit the vertical rise of the foam.

After passing from under the floating frame assembly the material covered foam slab proceeds into the curing chamber 42 where it becomes a relatively dense foam slab. Upon passage from the curing chamber the covering material, as mentioned earlier may, or may not, be stripped from the foam slab and wound upon windup rolls.

PREPARATION OF FOAM

Urethane compounds are generally produced by reacting a polyisocyanate having two to three isocyanato groups with a polyhydroxy compound of high molecular weight having preferably two to three terminal hydroxyl groups. Commercial urethanes have been prepared employing as the hydroxy compound polyhydric polyethers, polyhydric polyesters, various polyoxyalkylene glycols and various other polyhydric alcohols. The polyethers are usually polyalkylene ether glycols or triols, and the polyhydric polyesters are usually obtained by the reaction of a dicarboxylic acid with a polyhydric alcohol, glycol and polyglycols. The foams may be made by the prepolymer method or the "one-shot" method.

Suitable isocyanates include 2,4-tolylene diisocyanate; p-phenylene diisocyanate; diphenyl methane diisocyanate; m-phenylene diisocyanate; butylene-1,4-diisocyanate; 3,3'-dimethoxy-4,4'-biphenylene diisocyanate; benzene triisocyanate; naphthylene-2,4-diisocyanate; 3,3'-dimethyl-4,4'-biphenylene diisocyanate.

Suitable hydroxy compounds which may be reacted with any of the aforesaid isocyanates include glycerol; 1,3,6-hexane-triol, polypropylene ether glycol; polyisopropylene ether glycol; ethylene glycol; hexamethylenediol; propylene glycol; 1,4-butanediol; polyethylene glycol; sorbital hydroxy polyesters of cyclohexanediol; or other polyhydric alcohols or hydroxyl-terminated compounds.

Each of the above-mentioned isocyanates can be reacted with any of the above-mentioned hydroxy compounds in the presence of a catalyst to produce a urethane. In carrying out the reaction, the amount of the isocyanate compound may be selected so that each isocyanate group reacts with a hydroxy group. A slight molar excess of isocyanate may be employed.

The favored isocyanate compounds employed for extension of the chains and for the formation of branched polymers are the tolylene, phenylene and naphthylene diisocyanates, particularly the 1,5-naphthylene isomer, the 2,4-tolylene isomer and the 2,6-tolylene isomer.

Various methods may be employed to effect the hydroxyisocyanate reaction. One method is to free the hydroxyl-terminated polyether or polyester of water, heat to 100° C., and then to add all of the diisocyanate. An exothermic reaction takes place and is completed in a relatively short period of several minutes. The reaction product is kept free of water to avoid secondary crosslinking reactions prior to final curing. In a modified method, less than the stoichiometric equivalent of the diisocyanate is initially added to the preheated (about 100° C.) and dried polyether or polyester, the remainder being added for the subsequent crosslinking reaction with the hydrogen atoms of the formed urethane linkages in adjacent chains.

In the manufacture of polyurethane elastomers according to the method of this invention, it is customary to react one equivalent weight of a long chain linear (polyester or polyether) polyol having 2 to 3 terminal hydroxyl groups and a molecular weight of 1000 to 10,000 with at least 0.8 and usually no more than 12 equivalent weights of an organic (aliphatic or aromatic) diisocyanate. The molar ratio or equivalent weight ratio of isocyanate to polyol is usually 0.9:1 to 6:1 in both the prepolymer and one-shot systems. Such ratio may be in the neighborhood of 1:1 (i.e., 1.1:1 to 1.5:1).

When water is used as a crosslinking agent or to react with an isocyanate group, carbon dioxide gas is evolved, a urea linkage is formed, and the hydrogen atoms of such urea linkage are capable of reacting with unreacted isocyanate to form 3-dimensional crosslinked super molecules. The liberated carbon dioxide gas acts as a blowing agent when water is used as the crosslinking agent in the manufacture of foams. Where high molecular weight (i.e. a molecular weight above 800 or so) hydroxy terminated linear polyethers or polyesters and diisocyanates are used, soft, spongy, elastomeric foams are produced. As the hydroxyl content of the polyether or polyester increases, the foam becomes more rigid. This effect can be achieved with the linear polyethers or polyesters above if a polyisocyanate having three or more isocyanate groups is introduced alone or mixed with diisocyanates.

In crosslinking reactions effected in substantial absence of water, plastic compositions are obtained by molding or casting of the reaction mixture and subsequent curing in situ.

The crosslinking reaction is accelerated by very small amounts, often as low as 10 parts per million or less by weight of the hydroxylated component, of a catalyst such as diethylene tetramethylene tetramine. Ordinarily the catalyst is added to the initial reactants and no further catalyst addition will be required for promoting the final cure. If desired, however, and particularly in those instances where the initial catalyst is at a minimum, further addition of catalyst can be made in the crosslinking stage by stirring such catalyst into the molten reaction product. It is preferable to use no more than a small amount of the catalyst (i.e., no more than 2% by weight of said hydroxy compound). Since the reaction becomes too rapid for best practical operations when an amount of catalyst in excess of 1% by weight of the hydroxy compound is employed, it is preferably to use no more than that amount when making foam products.

Processes of making flexible polyester and polyether urethane foams are conventional. A typical process is to react a polyalkylene ether polyol having 2 to 3 terminal hydroxyl groups with an excess over a molar equivalent of an arylene diisocyanate, a very small amount of a polydimethyl silicone oil, and a small amount of an activator mixture consisting of a catalyst, water and/or a polyfunctional crosslinking agent (such as trimethylol propane). The amount by weight of the silicone oil is usually no more than 2% of the polyester plus diisocyanates. The amount of water required to produce a high quality elastic foam is usually in the range of 0.5 to 2.5 percent and preferably is no more than 5 percent of the total weight of polyether plus diisocyanate.

The amount of the crosslinking agent may be about 1 to 6 percent and is usually no more than 10 percent of the total weight of polyether plus isocyanate, although greater amounts may be used when making rigid or semi-rigid foams.

It will be understood that the amounts of the ingredients used is well known in the art and may be varied considerably.

What we claim is:

1. An apparatus useful in making polyurethane foams which comprises an elongated foaming mold support with a substantially horizontal bottom and with vertical sidewalls and which is elevated at one end to form an appreciable downward slope, a moveable web lining the inside, bottom and side surfaces of the said mold support, said side surfaces of said web being essentially perpendicular to the bottom surface of said web so that a substantially U-shaped elongated moveable mold is formed, means for discharging a foamable polyurethane liquid stream onto the bottom surface of said moveable elongated mold at said elevated end of said mold support so that said stream will have a propensity to flow toward the opposite end of the mold, narrow floating essentially horizontal adjustable means positioned from said liquid stream discharge means and adjacent said stream where it is still substantially a liquid foam stream and extending across the surface of said liquid foam stream and across essentially the width of said bottom surface of said mold, a porous top covering material for the foam, said top covering material being guided into contact with the substantially liquid foam stream by said floating adjustable means and forming the top surface of a foaming tunnel, said top covering material being essentially the same width as the bottom of said U-shaped mold and being a medium through which light pressure may be transferred from said floating adjustable means to the surface of the substantially liquid foam stream and adapted to apply even pressure to said liquid foam stream and to orient the liquid foam stream to aid in obtaining uniform density, said top covering being inclined upward to conform to the top surface of the rising foam and being coextensive with the top surface of the rising foam, a vertically and horizontally adjustable conveyor having an endless porous belt and being positioned above the top covering material and parallel to the direction of movement of the moveable U-shaped mold, said conveyor also being positioned from said liquid stream discharging means and from said floating adjustable means, the lower surface of said belt of said conveyor being in contact with the top surface of said top covering, said conveyor adapted to press against the top surface of said top covering material where the foam reaches at least substantially maximum height and thereby also against the foam to orientate said foam before it is cured, and means for moving said U-shaped mold along said support away from said discharge means, means for moving said top covering with the rising foam and with said U-shaped mold in the same direction as said U-shaped mold, and means for operating said conveyor in the same direction of movement as said top covering.

2. An apparatus according to claim 1 in which said narrow floating essentially horizontal adjustable means comprises a lightweight pivotal elongated shoe and where a rigid porous plate is positioned inside the belt of said conveyor and in contact with the inside surface of the lower surface of said belt.

References Cited
UNITED STATES PATENTS

| | | | |
|---|---|---|---|
| 2,841,205 | 7/1958 | Bird | 264—47 |
| 2,956,310 | 10/1960 | Roop et al. | 264—54 |
| 2,957,207 | 10/1960 | Roop et al. | 264—54 |
| 3,007,200 | 11/1961 | Paulsen et al. | 264—47 XR |
| 3,123,856 | 3/1964 | Dye et al. | 264—47 |
| 3,231,439 | 1/1966 | Voelker | 264—47 XR |
| 3,240,846 | 3/1966 | Voelker | 264—47 |

FOREIGN PATENTS

| | | |
|---|---|---|
| 842,267 | 9/1952 | Germany. |

ALEXANDER H. BRODMERKEL, *Primary Examiner.*

P. E. ANDERSON, *Assistant Examiner.*